(12) United States Patent
Oda (10) Patent No.: US 12,146,783 B2
(45) Date of Patent: *Nov. 19, 2024

(54) WINDSHIELD FOR BALANCE

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 371 days.

This patent is subject to a terminal disclaimer.

(21) Appl. No.: 17/765,788

(22) PCT Filed: Nov. 6, 2019

(86) PCT No.: PCT/JP2019/043469
§ 371 (c)(1),
(2) Date: Mar. 31, 2022

(87) PCT Pub. No.: WO2021/090396
PCT Pub. Date: May 14, 2021

(65) Prior Publication Data
US 2022/0364907 A1 Nov. 17, 2022

(51) Int. Cl.
*G01G 21/30* (2006.01)
(52) U.S. Cl.
CPC .................. *G01G 21/30* (2013.01)
(58) Field of Classification Search
CPC .............................. G01G 21/30; G01G 21/286
USPC ......................................................... 177/181
See application file for complete search history.

(56) References Cited

U.S. PATENT DOCUMENTS

| 5,058,692 A | 10/1991 | Melcher et al. |
| 9,383,252 B2 * | 7/2016 | Feldotte ................. G01G 21/28 |
| 11,175,176 B2 * | 11/2021 | Oda ....................... G01G 23/00 |
| 11,460,339 B2 * | 10/2022 | Oda ....................... E05F 15/56 |

(Continued)

FOREIGN PATENT DOCUMENTS

| EP | 1857788 A1 * | 11/2007 | ........... G01G 21/286 |
| JP | 07-083744 A | 3/1995 | |

(Continued)

OTHER PUBLICATIONS

International Search Report and Written Opinion issued in the corresponding Application No. PCT/JP2019/043469 Issued on Jan. 21, 2020.

*Primary Examiner* — Jacques M Saint Surin
(74) *Attorney, Agent, or Firm* — Studebaker & Brackett PC (57) ABSTRACT

A windshield for a balance which has a door that can be automatically opened and closed or half opened and half closed is provided. The windshield includes doors to which air cylinders are joined as driving means, sensors for monitoring movements of the doors, pressure sensors configured to monitor a pressure of air to be supplied to the air cylinders of the driving means, and a control unit configured to stop an air supply to the air cylinders when a pressure of air monitored by the pressure sensor exceeds a predetermined value. Stoppers are disposed on movement paths of the doors to block movement, and when air pressure inside the air cylinder increases to the predetermined value due to contact with the stopper, the door stops. The door can be freely fully opened and half-opened according to the position of the stopper.

3 Claims, 11 Drawing Sheets

(56) References Cited

U.S. PATENT DOCUMENTS

| | | | |
|---|---|---|---|
| 11,467,023 B2 * | 10/2022 | Meister | G01G 21/22 |
| 2006/0016134 A1 | 1/2006 | Luchinger et al. | |
| 2016/0265964 A1 | 9/2016 | Kuhlmann et al. | |
| 2023/0113500 A1 * | 4/2023 | Oda | G01G 21/30 |
| | | | 177/180 |

FOREIGN PATENT DOCUMENTS

| | | | |
|---|---|---|---|
| JP | 7-23239 U | | 4/1995 |
| JP | H0915031 | * | 1/1997 |
| JP | 2003-262549 A | | 9/2003 |
| JP | 2006-30188 A | | 2/2006 |
| JP | 2011-161531 A | | 8/2011 |
| JP | 2017-219501 A | | 12/2017 |
| WO | WO-2020129190 A1 * | 6/2020 | E05F 15/56 |

* cited by examiner

|  | Door 11 | | Standard state | During calibration |
|---|---|---|---|---|
|  | Automatic opening operation (move rearward) | Automatic closing operation (move forward) | Standard state (manually openable and closable) | During calibration |
| First one-way solenoid valve 66A | Open | Close | Open | Close |
| First pressurization pump 62A | Not operate | Pressurize | Not operate | Not operate |
| Second one-way solenoid valve 66B | Close | Open | Open | Close |
| Second pressurization pump 62B | Pressurize | Not operate | Not operate | Not operate |

WINDSHIELD FOR BALANCE

TECHNICAL FIELD

The present invention relates to a windshield for a balance which has a door to be automatically opened and closed, and more specifically, to a windshield the door of which can be automatically half-opened/closed.

BACKGROUND ART

Conventionally, a windshield having a door to be automatically opened and closed is used for an electronic balance with high weighing accuracy. By covering a weighing pan by the windshield, air flow around the weighing pan which is one of the factors for accuracy deterioration can be prevented, and by automatically opening and closing the door, workability of a weighing work is improved.

Here, to minimize the air flow, there is a need for automatically opening and closing the door at a half-opened position. Therefore, for example, in Patent Literature 1, a configuration is provided so as to automatically open and close the door at a desired opening degree.

CITATION LIST

Patent Literature

[Patent Literature 1] Japanese Published Unexamined Patent Application No. H07-83744

DISCLOSURE OF INVENTION

Technical Problem

However, in Patent Literature 1, a desired door opening degree needs to be kept in memory, and this is troublesome.

The present invention was made in view of the problem described above, and an object thereof is to provide a windshield for a balance the door of which can be automatically half-opened/closed by a simple operation.

Solution to Problem

In order to solve the problem described above, in an aspect of a windshield of the present disclosure, a windshield having a door to be automatically opened and closed by a driving means is configured to include a sensor configured to monitor movement of the door, a stopper disposed on a movement path of the door and configured to block movement of the door, and a control unit configured to stop the driving means when the sensor detects that movement of the door has been blocked. With this configuration, an opening degree of the door is determined according to a position where the stopper is disposed. The configuration is made so that the door is stopped by the stopper not only when the door is half-opened but also when the door is fully opened, so that the door can be half-opened without a special additional mechanism. A structure is realized such that the door can be half-opened only by disposing the stopper on the movement path of the door, and thus the operation is easy and switching is also easy. Further, a setting position of an opening degree of the door when it is half-opened/closed can also be grasped at a glance based on a disposed position of the stopper.

Moreover, in an aspect, an air cylinder is joined as the driving means to the door, the sensor is a pressure sensor configured to monitor a pressure of air to be supplied to the air cylinder, and the control unit is configured to stop the supply of air to the air cylinder when the pressure of air monitored by the pressure sensor exceeds a predetermined value. Accordingly, a configuration is brought about in that the air pressure of the air cylinder is monitored by the pressure sensor, and when the pressure inside the air cylinder increases due to contact of the door with something, the pressure sensor detects this increase and stops the air supply. A configuration is provided such that opening and closing are controlled according to a value of the pressure sensor, and the door is caused to naturally stop moving by coming into contact with something. The configuration is made so that opening and closing movements of the door stop when the door comes into contact with something, and the door can easily be automatically half-opened only by disposing the stopper on the movement path and causing the stopper to come into contact with the door. The door is also stopped when finger pinching or the like occurs, so that the pressure censor in the configuration serve safety function. Switching between half-opening and full-opening can also be easily made only by disposing and removing the stopper.

Moreover, in an aspect, the stopper is configured to be supported turnably near the door and selectively disposed on or out of the movement path of the door according to a turning angle of the stopper. Only by turning the stopper, setting of the door can be switched between half-opening/closing and full-opening/closing.

Advantageous Effects of Invention

According to the configuration described above, a windshield for a balance the door of which can be automatically half-opened/closed by a simple operation is provided.

DESCRIPTION OF EMBODIMENTS (Configuration of Electronic Balance with Windshield)

Figure 1:
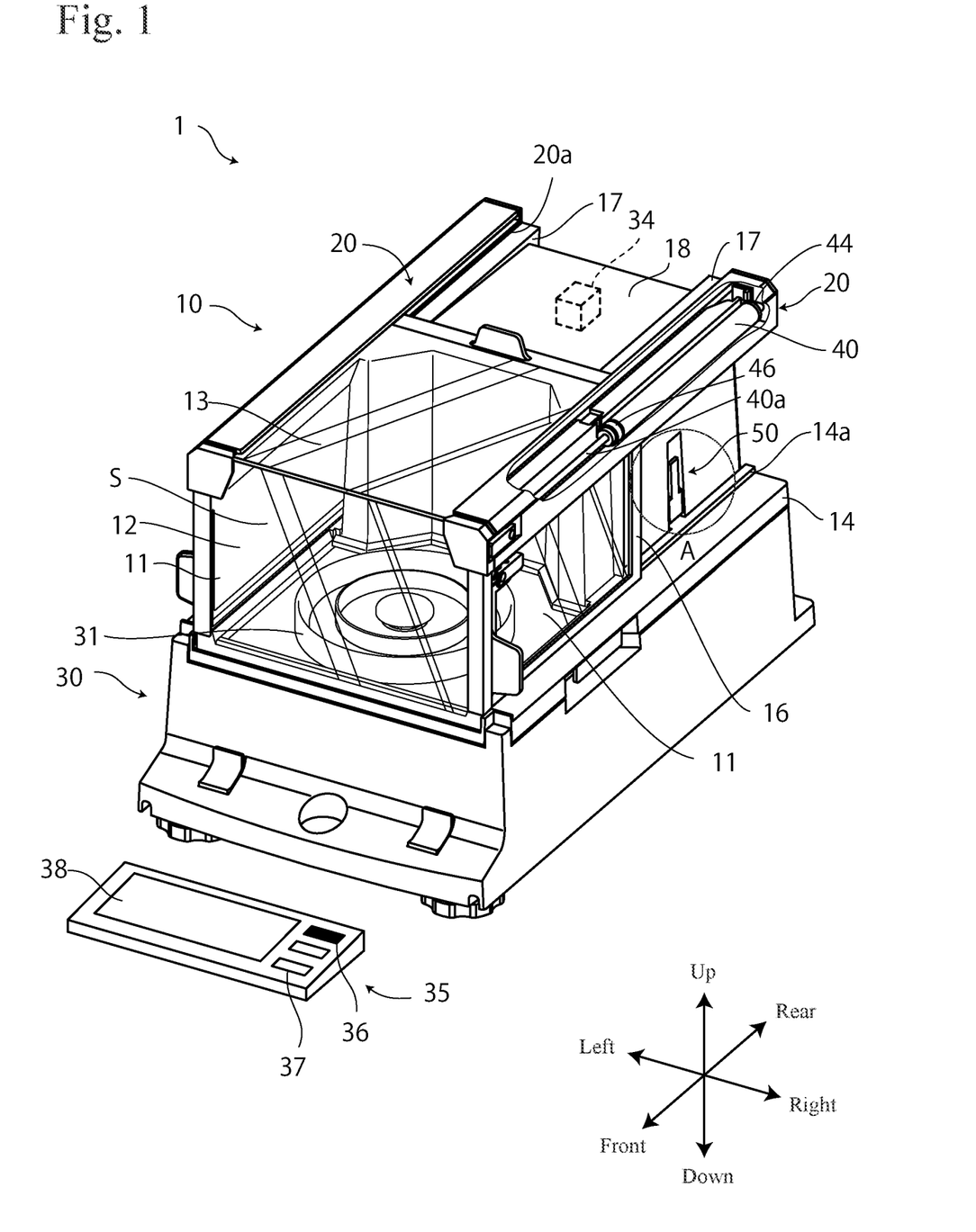
FIG. 1 is a partially broken-away perspective view of an electronic balance with a windshield according to a first embodiment.

Hereinafter, preferred embodiments relating to a configuration of the present disclosure are described with reference to the drawings. FIG. 1 is a partially broken-away perspective view of an electronic balance 1 with a windshield according to a first embodiment.

As illustrated in FIG. 1, the electronic balance 1 with a windshield includes an electronic balance 30 and a windshield 10. The balance main body 30 includes a weighing pan 31 for placing a specimen on its upper surface. The windshield 10 is disposed on an upper surface of the balance 30 so as to enclose the surrounding of the weighing pan 31, and prevents air flow around the weighing pan 31, for example, wind from an air conditioner, breath of a person at the time of weighing, and air flow generated when a person walks, etc., from acting as a wind pressure on a load-applied portion centered on the weighing pan 31 and influencing weighing.

The windshield 10 is detachably attached to the electronic balance 30, and for an attaching and detaching mechanism, a configuration conventionally known, for example, the configuration disclosed in Japanese Published Unexamined Patent Application No. 2008-216047 is used, however, without limitation to this, a configuration in which the windshield 10 and the electronic balance 30 are integrated in a non-separable manner is also possible.

The windshield 10 has a bottomless box shape, and has a front glass 12 at a front surface, a box-shaped case 18 at a back portion, doors 11 at portions of left and right side walls, and an upper surface door 13 at the upper surface, and as a space defined by these, a weighing chamber S having a rectangular parallelepiped shape is formed inside The doors 11 can respectively move forward and rearward along rails 14a provided on a lower frame 14 as a frame member at a lower portion of the windshield 10, and the upper surface door 13 can move forward and rearward along rails 20a provided in cylinder boxes 20 on left and right sides of an upper portion of the windshield 10.

For the front glass 12, the upper surface door 13, and the left and right doors 11, a transparent glass or resin material is used so that an internal state can be observed. To each of the upper surface door 13 and the doors 11, a handle 15 that assists sliding is attached. The upper surface door 13 can be manually opened and closed, and the doors 11 at the left and right side surfaces are configured so that they can be automatically and manually opened and closed.

A control panel 35 is for operating the balance main body 30 and the windshield 10, and is provided separately from the balance main body 30 and the windshield 10. This is to prevent vibration caused by an operation such as pushing on a switch from influencing weighing. The control panel is a separate body, so that a user can freely arrange the control panel at a position easy to operate. Although the control panel has a wireless communication function for signal transmission and reception, information may be transmitted and received by wire.

The control panel 35 includes, on an upper surface thereof, a display unit 38 to display weighing results and states, switches 37 for operation, and an infrared sensor 36. The infrared sensor 36 is an opening and closing switch of the doors 11, and only by holding a hand over the infrared sensor, can the doors 11 be automatically opened and closed. A press switch may be provided in place of the infrared sensor 36, and a configuration in which both of a press switch and the infrared sensor 36 are provided is also preferable. To the infrared sensor 36, a balance operating function other than the door 11 opening and closing function may be assigned. It is also possible that two left and right infrared sensors 36 are provided and configured to respectively open and close corresponding doors 11.

Upper frames 17 are provided to constitute left and right upper sides of the windshield 10 having a substantially rectangular parallelepiped shape, and the cylinder boxes 20 are engaged with the upper frames 17 so that their longitudinal directions match. The cylinder box 20 is a hollow housing, and inside, an air cylinder 40 serving as a driving means to open and close the door 11 is housed.

The air cylinder 40 is a double-acting type, and both of the forward and backward strokes of reciprocating motion of a piston inside the air cylinder 40 are made by air pressure, so that ports to feed air to the inside of the air cylinder 40 are provided at two positions. A retreat-side port 46 for making the piston move rearward by fed air is provided at the front side of the air cylinder 40, and an advance-side port 44 for making the piston move forward is provided at the rear side. To these ports 44 and 46, air tubes not illustrated are connected, and linked to the inside of the case 18.

Inside the case 18, pumps serving as drive sources of the air cylinder 40 and solenoid valves to control the flow and stoppage of air, and a control unit 34 to control these pumps and solenoid valves, etc., are housed.

(Structure of Door)

Figure 2:
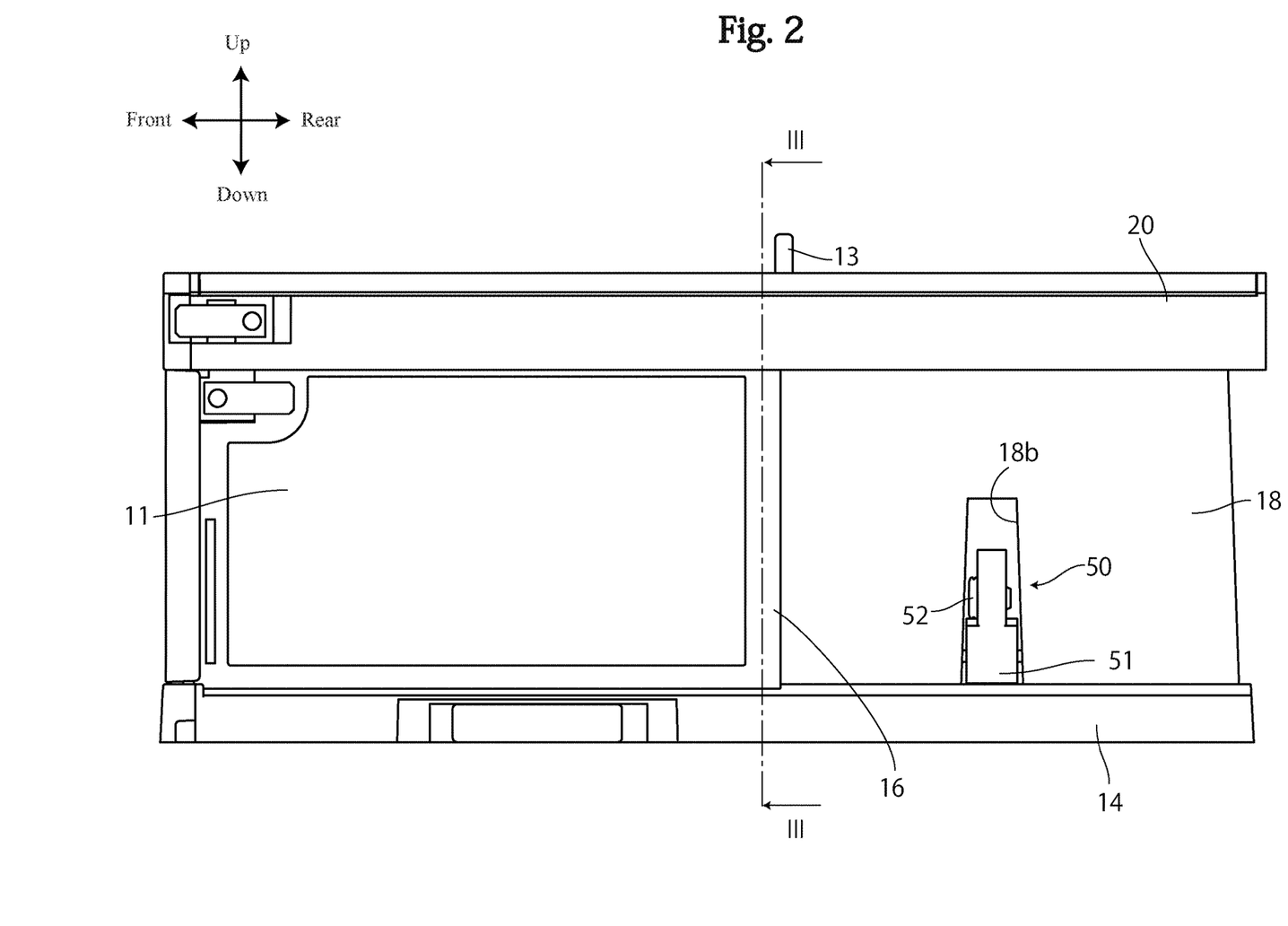
FIG. 2 is a right side view of the windshield.
Figure 3:
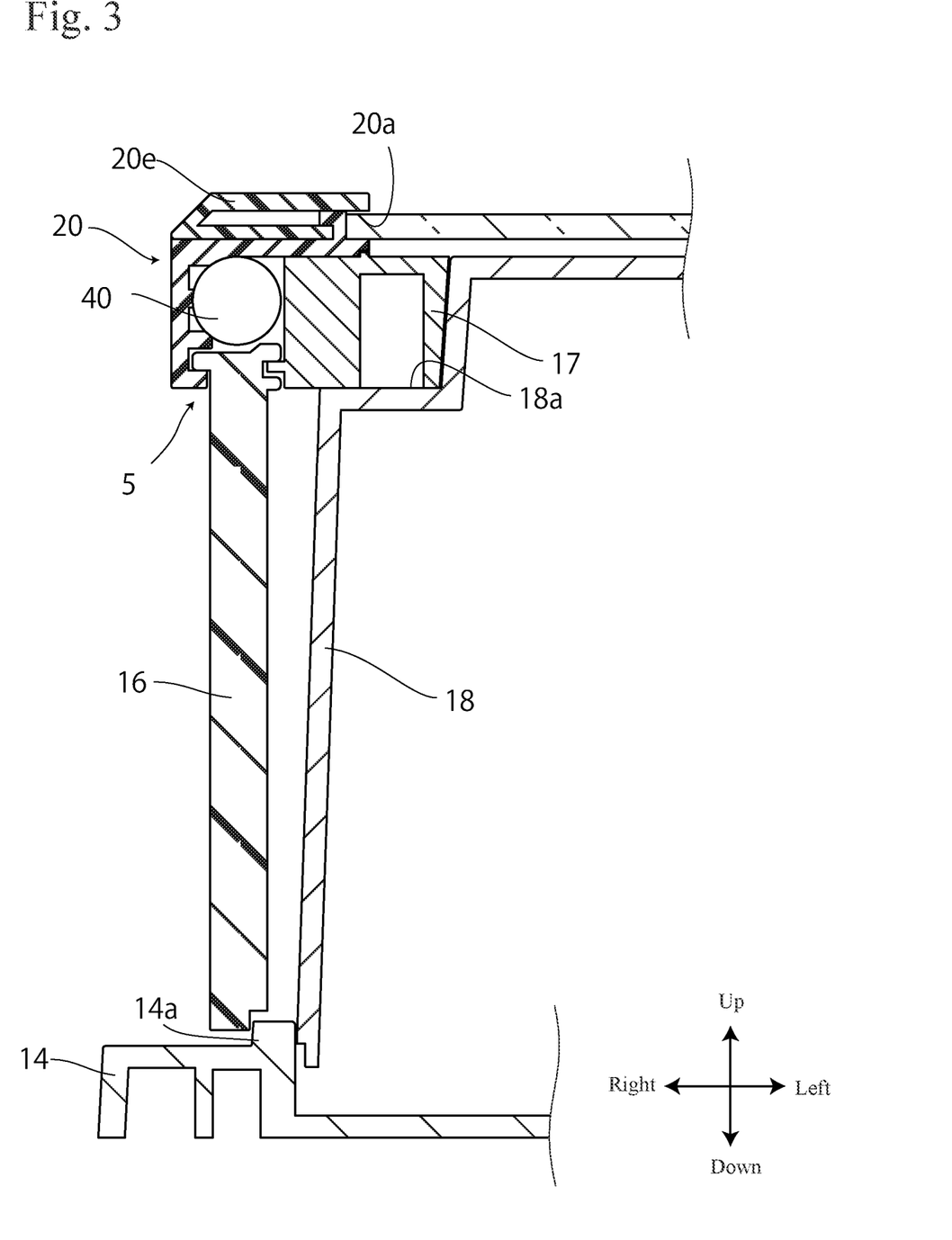
FIG. 3 is an end face view taken along line III-III in FIG. 2.
Figure 4:
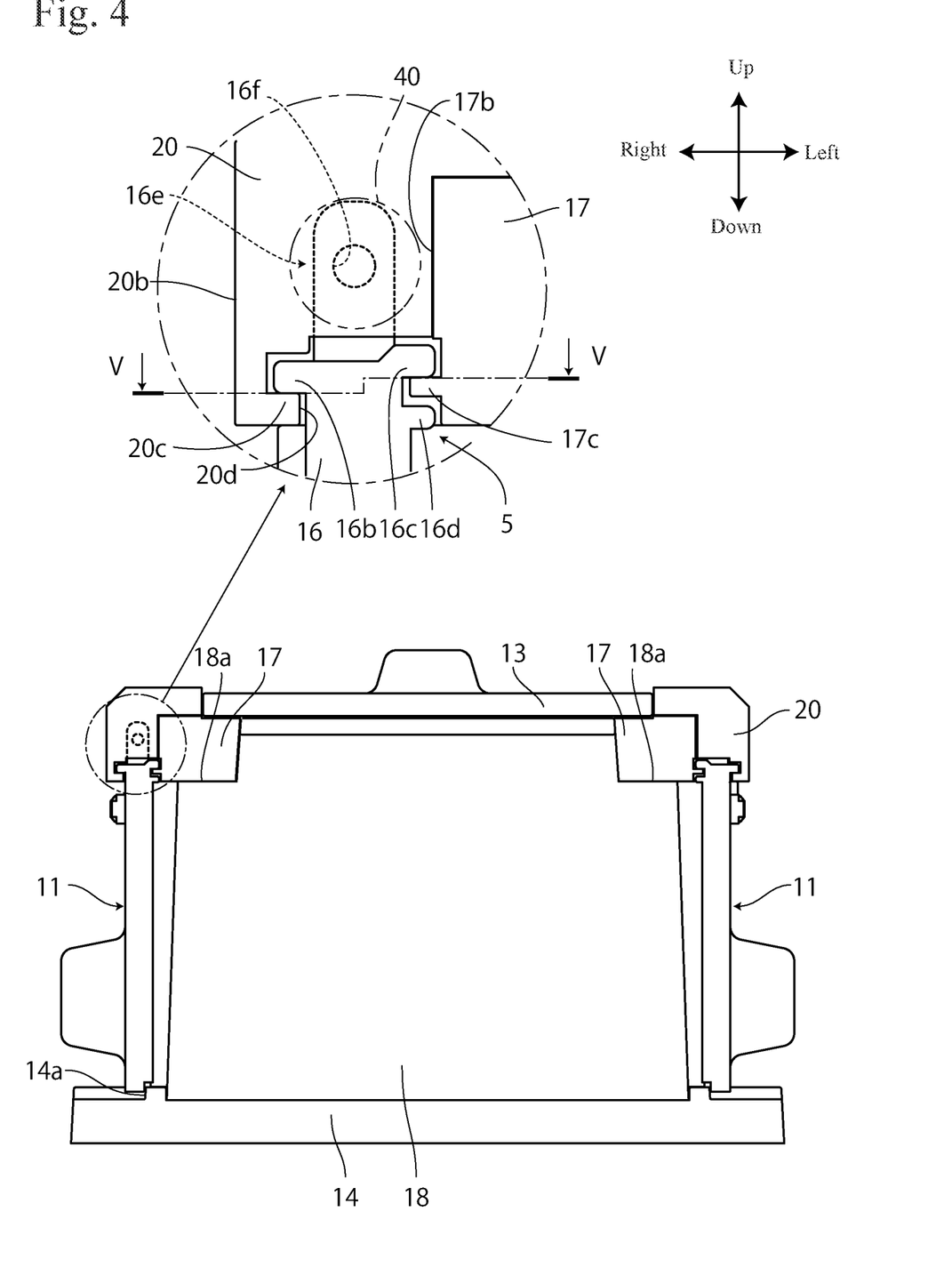
FIG. 4 is a back view of the windshield.
Figure 5:
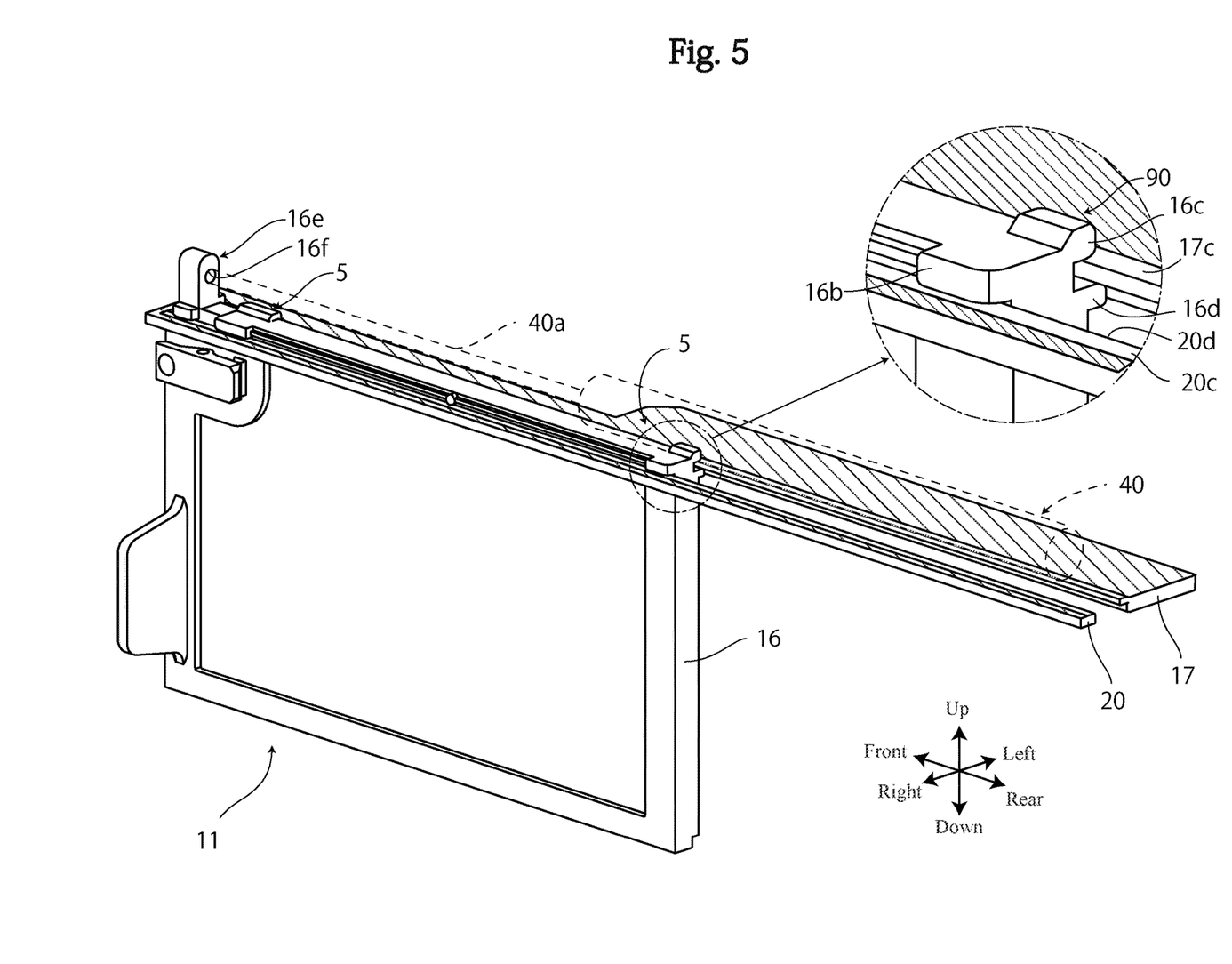
FIG. 5 is an explanatory view to describe a door opening and closing mechanism, and is a partial cross-sectional perspective view with a part broken away along line V-V in FIG. 4.

Next, an opening and closing mechanism of the door 11 and a structure of the mechanism will be described. FIG. 2 is a right side view of the windshield 10, and FIG. 3 is an end face view taken along line in FIG. 2, and FIG. 4 is a back view of the windshield 10. FIG. 5 is an explanatory view to describe a shape and a configuration of the door 11, illustrating only the door 11, the cylinder box 20, and the upper frame 17, and is a partial cross-sectional perspective view of the cylinder box 20 and the upper frame 17 cut along line V-V in FIG. 4.

As illustrated in FIG. 3, a recess portion is formed in an inner wall of the cylinder box 20 to match the shape of the air cylinder 40, and in this recess portion, the air cylinder 40 is engaged and fixed. The cylinder box 20 includes a cover 20e at an upper portion, and a rail 20a is formed by using the cover 20e as a presser.

As illustrated in FIGS. 4 and 5, the pair of upper frames 17 are disposed along concave portions 18a provided at left and right edge portions of an upper portion of the case 18, and constitute frame members at upper portions of the windshield 10. The cylinder box 20 has an external form of a pushed-out reversed L shape in a back view, and an upper side portion is placed on an upper surface of the upper frame 17, an inner surface comes into contact with a side surface of the upper frame 17, and a right-angle portion of the reversed L shape engages with a corner portion of the upper frame 17, and the cylinder box 20 is fixed so that its longitudinal direction matches the longitudinal direction of the upper frame 17.

The cylinder box 20 does not have a bottom surface (refer to FIG. 3), and an upper portion of the door 11 is disposed to enter the inside of the cylinder box 20. At a lower end portion of an outer side surface 20b of the cylinder box, an inner flange portion 20c is formed inward over the entire length in the longitudinal direction. In addition, at a lower portion of an outer side surface 17b of the upper frame 17, a projecting portion 17c extending over the entire length in the longitudinal direction (front-rear direction) is formed to face the inner flange portion 20c.

The door 11 is held by a holder 16 provided at an entire outer edge portion. At two front and rear positions of an upper portion of the holder 16, holding portions 5 projecting in a thickness direction (left-right direction) of the door 11 are formed orthogonal to a sliding direction (front-rear direction) of the door 11. The upper portion of the door 11 enters a slit (hereinafter, referred to as a guide hole 20d) formed between the inner flange portion 20c and the projecting portion 17c, and the holding portion 5 of the holder 16 engages with the inner flange portion 20c and the projecting portion 17c, and holds the door 11 in a hanging manner. Accordingly, the door 11 is disposed to separate from the upper surface of the lower frame 14 and the upper surface of the rail 14a formed on the lower frame 14, and is held slidably along the guide hole 20d. When dust and sand, etc., enter the rail 14a, a sliding resistance when opening and closing the door 11 increases, which makes it difficult to open and close the door 11, and this problem is prevented by hanging the door 11 itself from the upper portion.

The inner flange portion 20c and the projecting portion 17c are formed by not directly facing each other but being slightly offset in the up-down direction, and the projecting portion 17c at the inner side is at a position slightly higher than the inner flange portion 20c. This is to hold the door 11 in a stable posture by making slightly higher the inner side of the holding portion to incline the door 11 inward and bringing a lower portion of the door 11 into contact with the side surface of the rail 14a rather than the holding portion 5 projecting to the left and right at the same height from the upper portion of the door 11 and causing a state where the door 11 easily wobbles both leftward and rightward. With this configuration, the door 11 does not wobble when moved, and when opening and closing the door 11, the door 11 can be moved in a state of being kept in the same posture, and unexpected sliding of the door 11 can be prevented.

The holding portion 5 of the door 11 is formed to match the shapes and dispositions of the inner flange portion 20c and the projecting portion 17c, and consists of a first engagement portion 16b formed to project toward the inner flange portion 20c side disposed at the outer side, a second engagement portion 16c formed to project toward the projecting portion 17c side disposed at the inner side, and a third engagement portion 16d formed by being offset to the lower side of the second engagement portion 16c.

The third engagement portion 16d is formed to sandwich the projecting portion 17c between the third engagement portion 16d and the second engagement portion 16c, but the third engagement portion 16d is spaced from a bottom surface of the projecting portion 17c.

In the present embodiment, a hanging support form of the door 11 is configured in this way, however, other conventionally known configurations may also be used such as a form in which the holding portion 5 formed into a T shape is engaged in a slit formed in a flat plate or a form in which the holding portion 5 formed into a hook shape is engaged with a projecting rail.

As illustrated in FIG. 5, at a front end upper portion of the holder 16, a coupling portion 16e is formed. The coupling portion 16e is provided to project to the upper side of the door 11, and in the center of the coupling portion, a coupling hole 16f is formed along the sliding direction of the door 11. A tip end of a piston rod 40a extending from the piston inside the air cylinder 40 is fitted and fixed into the coupling hole 16f. The piston (piston rod 40a) is connected to the door 11 by the holder 16, and by the piston being moved forward and rearward by air, the holder 16 slides along the guide hole 20d, so that the door 11 opens and closes.

Even in the state where the holder 16 is engaged with the inner flange portion 20c, the air cylinder 40 does not come into contact with an upper surface of the holder 16, and is fixed at a distance from the holder 16 (refer to FIG. 3), and the air cylinder 40 does not obstruct movement of the door 11. The coupling portion 16e projects to a higher position than the upper surface of the holder 16, however, because the coupling portion 16e is fixed to the tip end of the piston rod 40a, the coupling portion 16e does not enter the lower side of the air cylinder 40, and a path of the coupling portion 16e is secured inside the cylinder box 20, so that the cylinder box 20 and the coupling portion 16e do not interfere with each other.

The air cylinder 40 serving as a driving means of the door 11 is disposed substantially right above the door 11 so as to be parallel to the sliding direction of the door 11. The holder 16 that supports the door 11 in a hanging manner is joined to the air cylinder 40 by the coupling portion 16e formed on the upper surface, so that the air cylinder 40 directly slides the holder 16 supporting the door 11 in a hanging manner to open and close the door 11. Therefore, force transmissibility from the air cylinder 40 is high, the door 11 can be opened and closed with small force, and the door 11 can be smoothly opened and closed.

(Half-Opening Mechanism)

Figure 6:
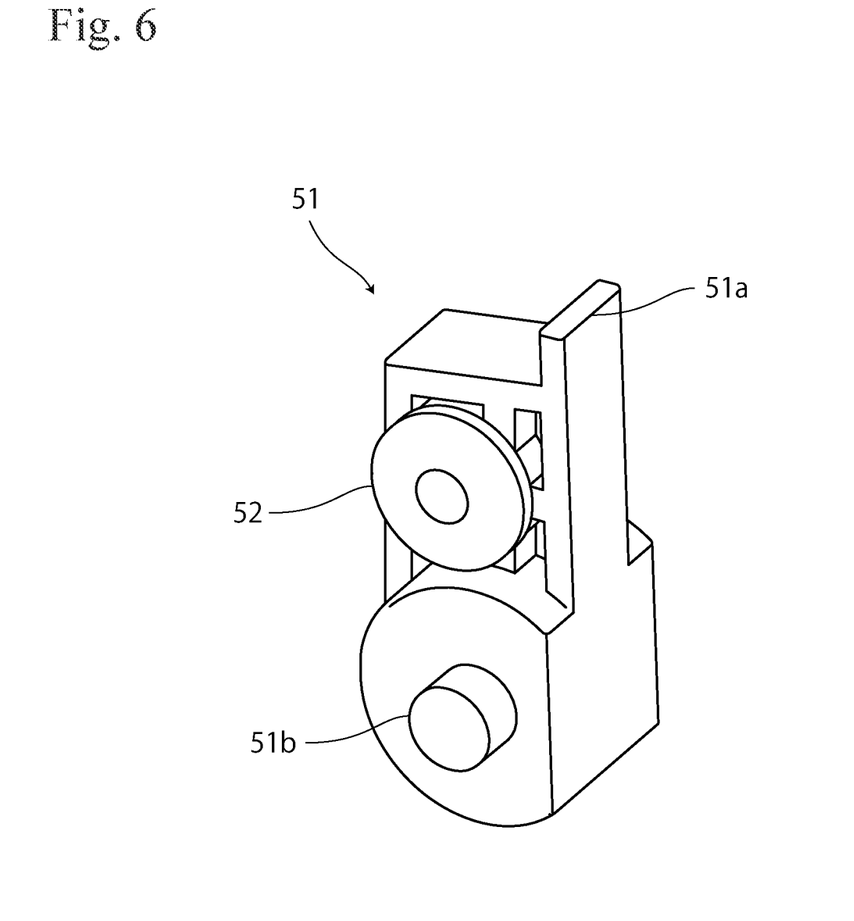
FIG. 6 is a perspective view of a stopper of a half-opening mechanism of the door.
Figure 7A:
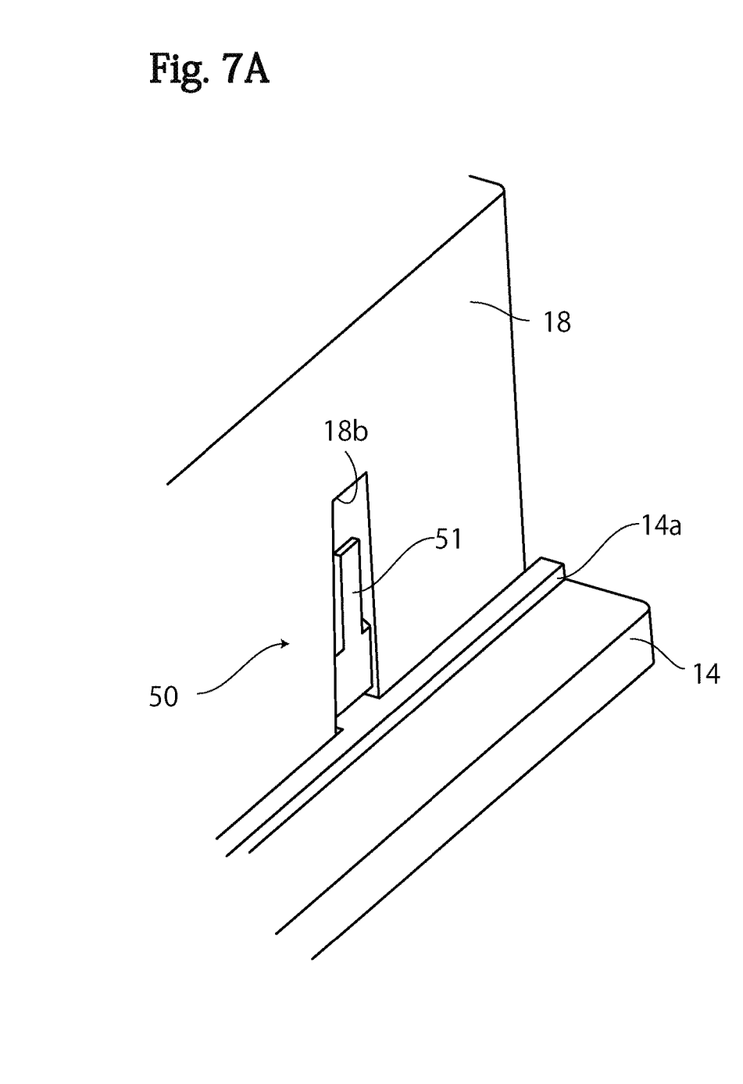
FIGS. 7A and 7B are explanatory views to describe the half-opening mechanism of the door according to the first embodiment.
Figure 7B:
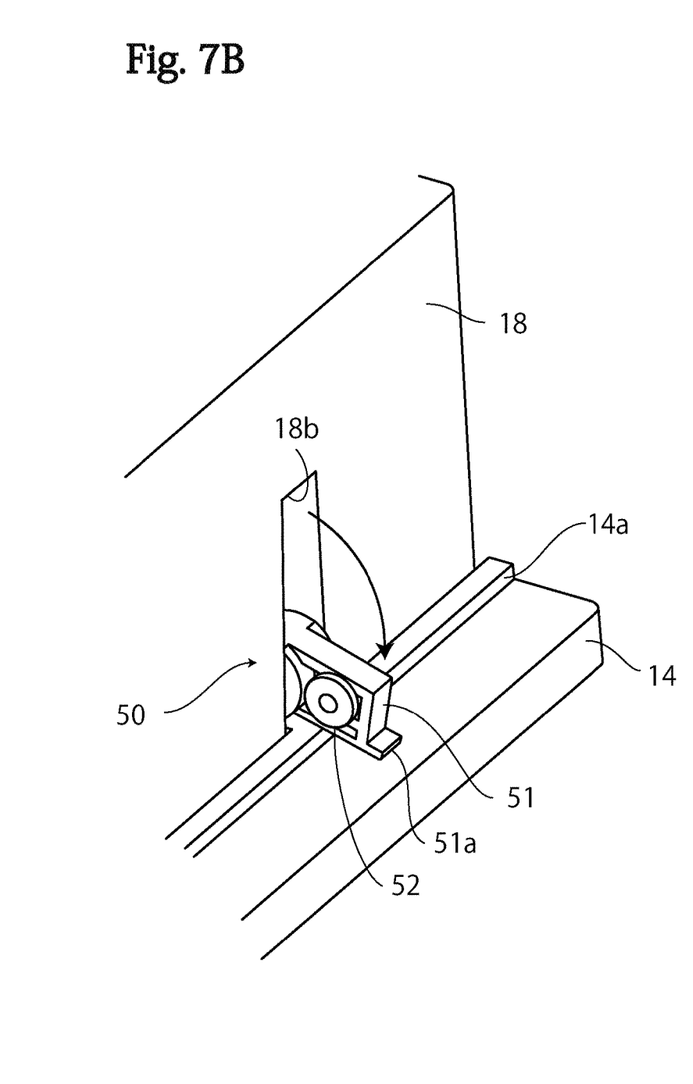

Next, a half-opening mechanism 50 for half-opening the door 11 will be described. FIG. 6 is a perspective view of a stopper 51 serving as a latching member of the door 11. FIG. 7 are enlarged views of portion A in FIG. 1, and are explanatory views to describe a turning state of the stopper 51 by illustrating only the case 18 and the stopper 51. FIG. 7(A) illustrates a non-use state of the stopper 51, and FIG. 7(B) illustrates a use state of the stopper 51.

As illustrated in FIG. 6, the stopper 51 has an external form having an upper portion in a substantially rectangular parallelepiped shape, and a lower portion in a columnar shape. A grip portion 51a projecting from the upper surface and a rotary shaft 51b projecting in a front-rear direction in the center of the columnar shape of the lower portion are respectively formed. At an upper portion of the front surface, an elastic member 52 is fitted and fixed into a hole (not illustrated) formed in the front surface of the stopper 51.

In a side surface of the case 18, a storage portion 18b formed and recessed inward to match a size of the stopper 51 is provided (refer to FIG. 2). The stopper 51 is disposed inside the storage portion 18b so that the rotary shaft 51b becomes parallel to the sliding direction of the door 11, and is held turnably around the rotary shaft 51b. At this time, the elastic member 52 is disposed at a side (front side) closer to where the door 11 is disposed.

As illustrated in FIG. 7(A), when the stopper 51 is not used, the stopper 51 is held in an erect state inside the storage portion 18b. Therefore, the stopper does not block movement of the door 11.

As illustrated in FIG. 7(B), when the stopper 51 is used, the grip portion 51a at the upper portion is gripped and the stopper 51 is drawn out from the storage portion 18b. The stopper 51 turns from the state illustrated in FIG. 7(A), and in a state where the upper portion of the stopper 51 crosses the rail 14a, a side surface of the stopper 51 comes into contact with the upper surface of the rail 14a to be held.

The stopper 51 is disposed for the purpose of blocking movement of the door 11, and according to a turning angle of the stopper 51, the stopper 51 is selectively disposed on or out of the movement path of the door 11.

(Block Diagram)

Figure 8:
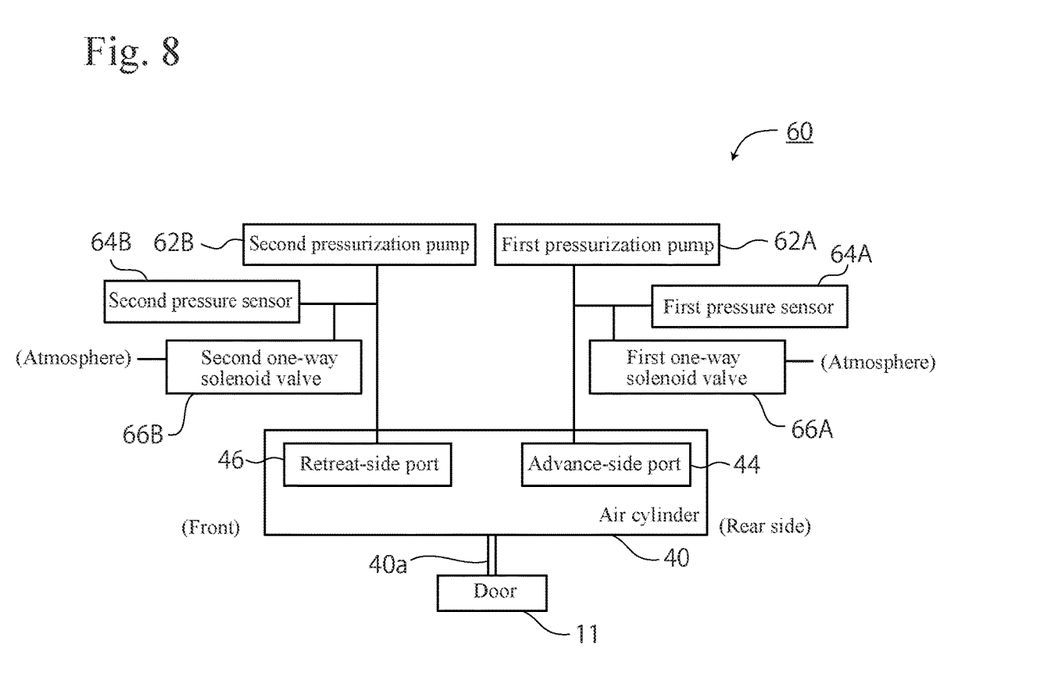
FIG. 8 is a block diagram of a door opening and closing mechanism according to the first embodiment.

An automatic opening and closing mechanism of the door 11 will be described in detail. FIG. 8 is a block diagram illustrating an opening and closing mechanism 60 of the door 11 of the electronic balance 1 with a windshield. The opening and closing mechanism 60 is a mechanism for opening and closing the door 11, and each of the left and right doors 11 includes the opening and closing mechanism 60, and is controlled independently by the connected opening and closing mechanism 60. In the present embodiment, a pump that moves the piston inside the air cylinder 40, that is, the piston rod 40a extending from the piston, forward (advances) and a pump that moves the piston rearward (retreats) exist separately.

The opening and closing mechanism 60 includes a first pressurization pump 62A, a second pressurization pump 62B, a first pressure sensor 64A, a second pressure sensor 64B, a first one-way solenoid valve 66A, a second one-way solenoid valve 66B, and an air cylinder 40. The air cylinder 40 is connected to the door 11 through the piston rod 40a.

Both of the first pressurization pump 62A and the second pressurization pump 62B are air pumps. These pumps are drive sources of the air cylinder 40, and compress air and feed the compressed air to the air cylinder 40, and move the piston by air pressure to move the door 11.

Outlet sides of the first one-way solenoid valve 66A and the second one-way solenoid valve 66B are opened to the atmosphere, and by opening and closing the valves, the flow and stoppage of air are controlled.

The first pressure sensor 64A monitors a pressure of air discharged from the first pressurization pump 62A, and the second pressure sensor 64B monitors a pressure of air discharged from the second pressurization pump 62B. Because the two pressure sensors 64A and 64B are respectively connected to the two ports 44 and 46 of the air cylinder 40, the pressure sensors in other words monitor a pressure of air to be supplied to the air cylinder 40 and a pressure of air inside the air cylinder 40.

To the advance-side port 44 provided at the rear side of the air cylinder 40, the first pressurization pump 62A is connected. This connection has a branch halfway, and the first pressure sensor 64A and the first one-way solenoid valve 66A are further connected. To the retreat-side port 46 provided at the front side of the air cylinder 40, the second pressurization pump 62B is connected. This connection has a branch halfway, and the second pressure sensor 64B and the second one-way solenoid valve 66B are connected to this branch.

Operations of the respective components of the opening and closing mechanism 60 are controlled by the control unit 34 disposed inside the case 18.

(Operation when Opening and Closing Door)

Figure 9:
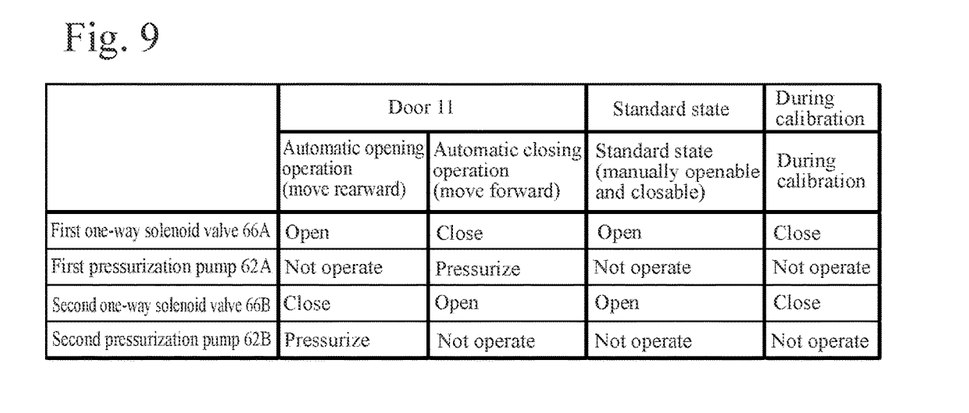
FIG. 9 is an operation chart of the door opening and closing mechanism according to the first embodiment.

Next, operations of the respective components when the door 11 is automatically opened and closed are described. FIG. 9 is an operation chart of the opening and closing mechanism 60.

First, in a "standard state" in which a user can manually open and close the door 11, neither of the first pressurization pump 62A and the second pressurization pump 62B is activated, and the first one-way solenoid valve 66A and the second one-way solenoid valve 66B are open. Because neither of the pressurization pumps (62A and 62B) operates, and both of the one-way solenoid valves (66A and 66B) are opened and communicate with the atmosphere, no load is applied from the air cylinder 40, and the door 11 can be smoothly manually opened and closed.

When a command to "open/close door" is input from the infrared sensor 36 of the control panel 35, the control unit 34 commands the respective components to operate.

In a case of an "automatic opening operation" to open the door 11, that is, in a case where the piston inside the air cylinder 40 is moved rearward, the second one-way solenoid valve 66B is closed, and pressurization of the second pressurization pump 62B is started. At this time, the first pressurization pump 62A is not activated, and the first one-way solenoid valve 66A is open, so that the piston is moved rearward by an air pressure, and the door 11 is opened.

When the door 11 fully opens, the air pressure rapidly increases, so that when this change is detected by the second pressure sensor 64B, the second pressurization pump 62B is stopped, the second one-way solenoid valve 66B is opened, and the compressed air inside the air cylinder is released to the atmosphere, and the mechanism returns to the standard state.

In a case of an "automatic closing operation" to close the door 11, that is, in a case where the piston inside the air cylinder 40 is moved forward, the first one-way solenoid valve 66A is closed, and pressurization of the first pressurization pump 62A is started. At this time, the second pressurization pump 62B does not operate, and the second one-way solenoid valve 66B is open, so that the piston is moved forward by an air pressure, and the door 11 is closed.

When the door 11 fully closes, the air pressure rapidly increases again, so that when this change is detected by the first pressure sensor 64A, the first pressurization pump 62A is stopped, the first one-way solenoid valve 66A is opened, and the compressed air inside the air cylinder is released to the atmosphere, and the mechanism returns to the standard state.

On the other hand, when calibration is performed, the first one-way solenoid valve 66A and the second one-way solenoid valve 66B are closed. Both of the one-way solenoid valves (66A and 66B) are closed, the piston inside the air cylinder 40 can move neither forward nor rearward, and the door 11 is locked. This is to prevent the door from being unexpectedly opened during calibration operation and influencing calibration. After the calibration is finished, the first one-way solenoid valve 66A and the second one-way solenoid valve 66B are opened, and the mechanism returns to the standard state.

In this way, the door 11 is automatically locked during calibration operation. The door 11 may be configured to be locked according to a command from the switch 37. Not only during calibration, the door 11 can also be locked during transportation.

When one pressurization pump operates, the other pressurization pump does not operate, and only one solenoid valve is closed, and the other solenoid valve is opened and communicates with the atmosphere. When the pump that has been operating stops, the closed solenoid valve opens and communicates with the atmosphere. In other words, all of the one-way solenoid valves are configured to open and communicate with the atmosphere when the pressurization pumps stop. After the door 11 is automatically opened/closed, air is released to the atmosphere, and the load applied to the door 11 is eliminated, and it becomes possible to smoothly manually move the door 11. The door 11 is automatically openable and closable, while after it is automatically opened/closed, manual opening and closing are enabled immediately without any special operation.

(Operation and Effect)

When the door 11 is at a fully closed position, it comes into contact with the front glass 12. Specifically, the door comes into contact with an elastic member not illustrated provided on a back surface of the front glass 12. As described above, the opening and closing mechanism 60 is not provided with a sensor such as a position sensor to detect fully closed/opened positions, and is configured so that an increase in air pressure is detected by the pressure sensor, and when the air pressure reaches a predetermined value or more, the pressurization pump is stopped. The increase in air pressure is caused when the pressurization pump tries to continue air feeding even in a state where movement of the piston is blocked for some reason.

In an "automatic closing operation," the door 11 comes into contact with the front glass 12, and accordingly, the piston that has moved the door 11 also becomes immovable, and the first pressurization pump 62A tries to feed air and the air pressure increases, and the first pressure sensor 64A detects this increase and stops the first pressurization pump 62A.

In an "automatic opening operation," the piston moves to an end portion of the air tube inside the air cylinder 40, and comes into contact with the end portion and becomes immovable, and the second pressurization pump 62B tries to feed air and the air pressure increases, and the second pressure sensor 64B detects this increase and stops the second pressurization pump 62B.

As described above, in the present embodiment using the air cylinder 40 as a driving means of the door 11, there is a configuration such that movement of the door 11 is monitored by the pressure sensor, and the piston inside the air cylinder 40 or the door 11 connected to the piston comes into contact with something and accordingly the air pressure inside the air cylinder 40 rises, and when the pressure sensor detects that the air pressure has reached a predetermined value or more, the pressurization pump is stopped, so that movement of the door 11 is stopped. That is, the configuration is made such that movement of the door 11 stops by the door 11 coming into contact with something, and a stop position of the door 11 is determined according to a disposed position of an object that comes into contact with the door 11 and blocks movement of the door.

Even during movement of the door 11, when the door 11 comes into contact with a movement blocking object, the door stops at the contact position, when next signal is input from the infrared sensor 36, air is fed from the opposite port, so that the door starts to move in the opposite direction from that stop position. By disposing an obstruction at a desired position on the movement path of the door 11, a stop position of the door 11 can be freely determined.

By using this, the half-opening mechanism 50 automatically half-opens/closes the door 11. That is, when the stopper 51 is not disposed on the movement path of the door 11, movement of the door 11 is not obstructed and the door 11 fully opens and closes automatically, and on the other hand, when the stopper 51 is disposed on the movement path of the door 11, halfway through the movement of the door 11 from a fully closed state to a fully opened state, the door 11 comes into contact with the elastic member 52 fitted to the stopper 51 and stops, when a signal is input from the infrared sensor 36, the door 11 moves forward from that stop position and comes into contact with the front glass 12 and stops at the fully closed position. The stopper 51 is disposed substantially in the middle of the movement path of the door 11, so that by using (turning) the stopper 51, the door 11 can be automatically half-opened/closed.

By disposing/removing the stopper 51 on or from the movement path of the door 11, switching can be easily made between full-opening/closing and half-opening/closing of the door 11. The position of the stopper 51 can be changed only by gripping the grip portion 51a and drawing out or pushing in the stopper, and thus disposition change is extremely simple, and the state of setting can also be grasped at a glance.

(Flowchart)

Figure 10:
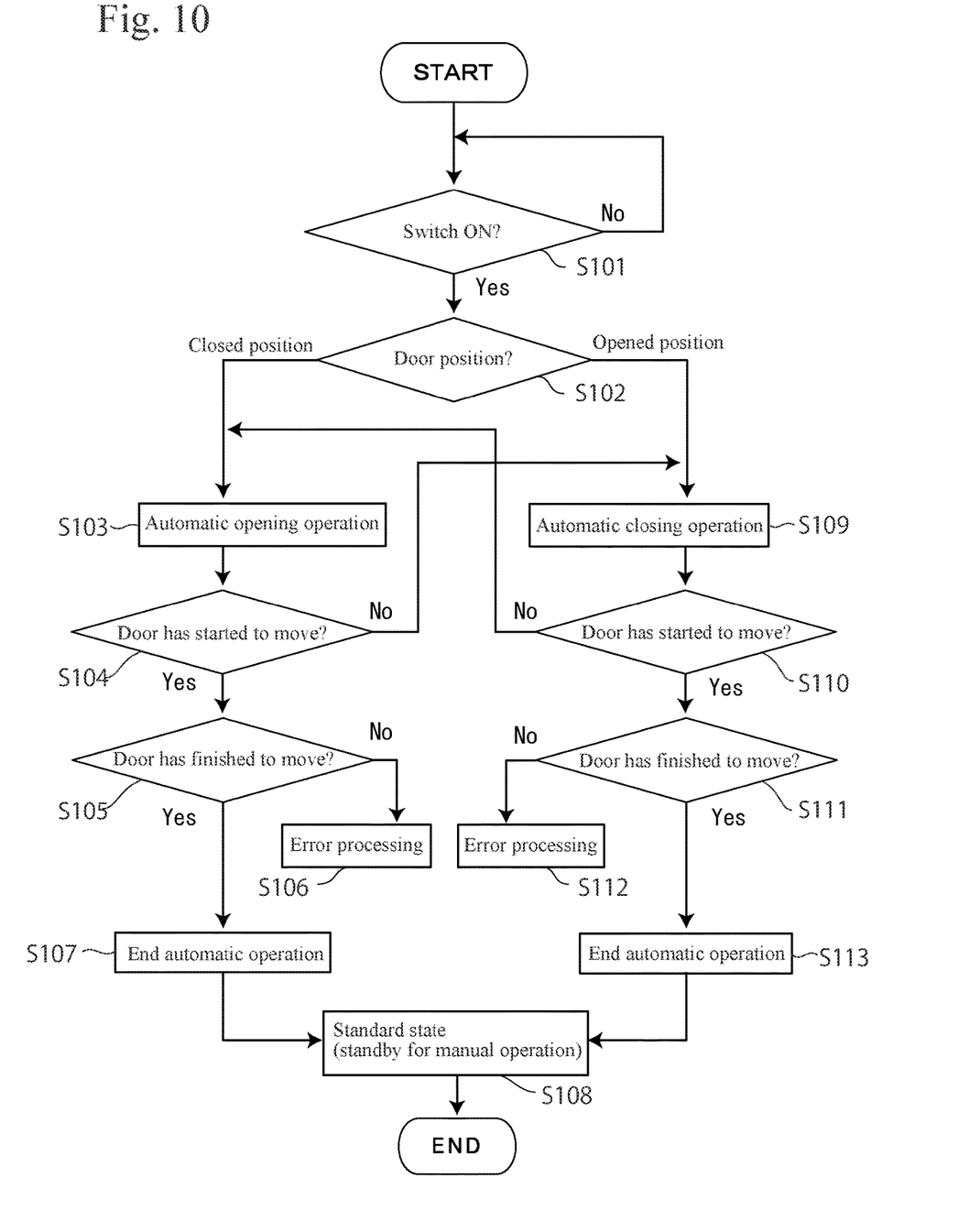
FIG. 10 is a flowchart of door opening and closing operations according to the first embodiment.

Next, a flow of opening and closing operations of the door 11 is described with reference to the flowchart in FIG. 10.

In Step S101, from the infrared sensor 36 of the control panel 35, which is a switch to open and close the door 11, a command signal to open/close the door 11 is input. When the signal is not input, the mechanism waits until the signal is input.

When a command is input, the process shifts to Step S102, and whether the door position is at a closed position or an open position is checked. In the present embodiment, the control unit 34 keeps a last opening/closing operation of the door 11 in memory, and makes determination according to the content.

Here, the door 11 is configured so that it can be automatically half-opened and further, can also be manually opened and closed, so that the door 11 that is open even slightly is regarded as being in an opened state, and the door 11 being at an opened position means that the door is not at a closed position. On the other hand, being at the closed position means that the door 11 is in a fully closed state. Therefore, a configuration is also possible in which a photointerrupter is provided as a position sensor at the fully closed position of the door 11 so as to determine whether the door 11 is at the closed position.

First, a case where the door 11 is at the closed position (Steps S103 to S108) is described.

The process shifts to Step S103, and in order to open the door 11 that is at the closed position, the "automatic opening operation" for the door 11 is performed. In detail, the second one-way solenoid valve 66B is closed, and operation of the second pressurization pump 62B is started. At this time, the first one-way solenoid valve 66A is left open, and the first pressurization pump 62A is not activated (refer to FIGS. 8 and 9).

Next, the process shifts to Step S104, and whether the door 11 has started to move is checked. When the door 11 starts to move, the air pressure rapidly decreases, so that when a value of the second pressure sensor 64B rapidly decreases within a predetermined time, for example, within one second, it is determined that the door 11 has started an opening operation. When the door 11 does not start to move within the predetermined time, the control unit 34 determines that "door 11 has already been opened," and the process shifts to Step S109, and then, the "automatic closing operation" is started (described later). Alternatively, when a value of the second pressure sensor 64B exceeds a predetermined value, it is also possible to determine that the door has not started to move. A last position of the door 11 is kept in memory, however, in the present embodiment, manual opening and closing are also possible, and the position of the door 11 is moved by a user in some cases. Against such a case or an erroneous determination of the door 11 position, security is provided by this Step S104.

When movement of the door 11 is started, the process shifts to Step S105, and whether the opening operation of the door 11 has been finished is checked. When the movement of the door 11 is completed, the air pressure increases again, and when a value of the second pressure sensor 64B increases again within a predetermined time, it is determined that the opening operation of the door 11 has been finished. When the value of the second pressure sensor 64B does not increase within the predetermined time, air leakage or malfunction is suspected, so that to perform error handling, the process shifts to Step S106.

In Step S106, as the error handling, a warning tone is produced, an error is displayed on the display unit 38, the operation of the second pressurization pump 62B is stopped, the second one-way solenoid valve 66B is opened, and the mechanism is brought to an emergency stop.

When completion of the opening operation of the door 11 is confirmed according to an air pressure increase, the process shifts to Step S107, the operation of the second pressurization pump 62B is stopped, the second one-way solenoid valve 66B is opened, and the automatic operation is normally finished.

Last, the process shifts to Step S108, the mechanism returns to the standard state, and manual opening and closing are enabled.

Next, a case (S109 to S113) where the door 11 is at the open position in Step S102 is described.

The process shifts to Step S109, and in order to close the door 11 that is at the open position, the "automatic closing operation" for the door 11 is performed. In detail, the first one-way solenoid valve 66A is closed, and operation of the first pressurization pump 62A is started. At this time, the second one-way solenoid valve 66B is left open, and the second pressurization pump 62B is not activated (refer to FIGS. 8 and 9).

Next, the process shifts to Step S110, and whether the door 11 has started to move is checked. As in Step S104, when a value of the first pressure sensor 64A rapidly decreases within a predetermined time, it is determined that the door 11 has started a closing operation. When the door 11 does not start to move within the predetermined time, the control unit 34 determines that "the door 11 has already been closed," and the process shifts to Step S103, and then, the "automatic opening operation" is started. Like Step S104, this step S110 also provides security against a case where the door 11 position is moved by manual opening and closing and an erroneous determination.

When movement of the door 11 is started, the process shifts to Step S111, and whether the closing operation of the door 11 has been finished is checked. Completion of the movement of the door 11 is determined when the value of the first pressure sensor 64A increases again within a predetermined time. When the value of the first pressure sensor 64A does not increase within the predetermined time, to perform error handling again, the process shifts to Step S112. When completion of the door closing operation is confirmed according to an increase in value of the first pressure sensor 64A within the predetermined time, the process shifts to Step S113.

In Step S112, as error handling, a warning tone is produced, an error is displayed on the display unit 38, the operation of the first pressurization pump 62A is stopped, the first one-way solenoid valve 66A is opened, and the mechanism is brought to an emergency stop.

When an increase in value of the first pressure sensor 64A within the predetermined time is confirmed, the process shifts to Step S113, the operation of the first pressurization pump 62A is stopped, and the first one-way solenoid valve 66A is opened.

Last, the process shifts to step S108, the mechanism returns to the standard state, and manual opening and closing are enabled.

As described in Steps S105 and S111, finish of opening or closing of the door 11 of the present embodiment is determined according to an air pressure increase. Therefore, in all cases where the air pressure increases for some reason, the processing shifts to Step S107 or S113 and the automatic operation ends.

An air pressure increase is caused by blocking of movement of the door 11. This serves as a safety function for prevention of finger pinching, etc., as well as determination of an opening degree of the door by intended installation of a movement obstruction such as the stopper 51. Also in a case where, when the door 11 is about to be automatically closed or opened, a worker's finger is pinched in the door 11, or a specimen or the like is caught by the door 11, or there is trouble with movement of the door 11 and the movement is forcibly stopped, the air pressure increases, so that this increase is detected by the first pressure sensor 64A (or the second pressure sensor 64B) and the operation of the door 11 is immediately stopped, and both one-way solenoid valves (66A and 66B) are caused to communicate with the atmosphere and the load applied to the door 11 is eliminated and safety is secured.

Because the door 11 is also stopped in response to an air pressure increase at the time of normal automatic opening and closing of the door 11, stoppage by the stopper 51 is not an emergency means but a normal means to stop movement of the door 11. Further, stoppage as a safety function is also by stoppage as a normal means, so that it is configured to have effects both as a safety function and the half-opening function without an additional special component. Further, after the stoppage, air is fed from the opposite port, so that a switching operation and a releasing operation, etc., are not required. The safety function and the automatic half-opening function at a desired position are realized by the simple configuration.

Second Embodiment

Figure 11:
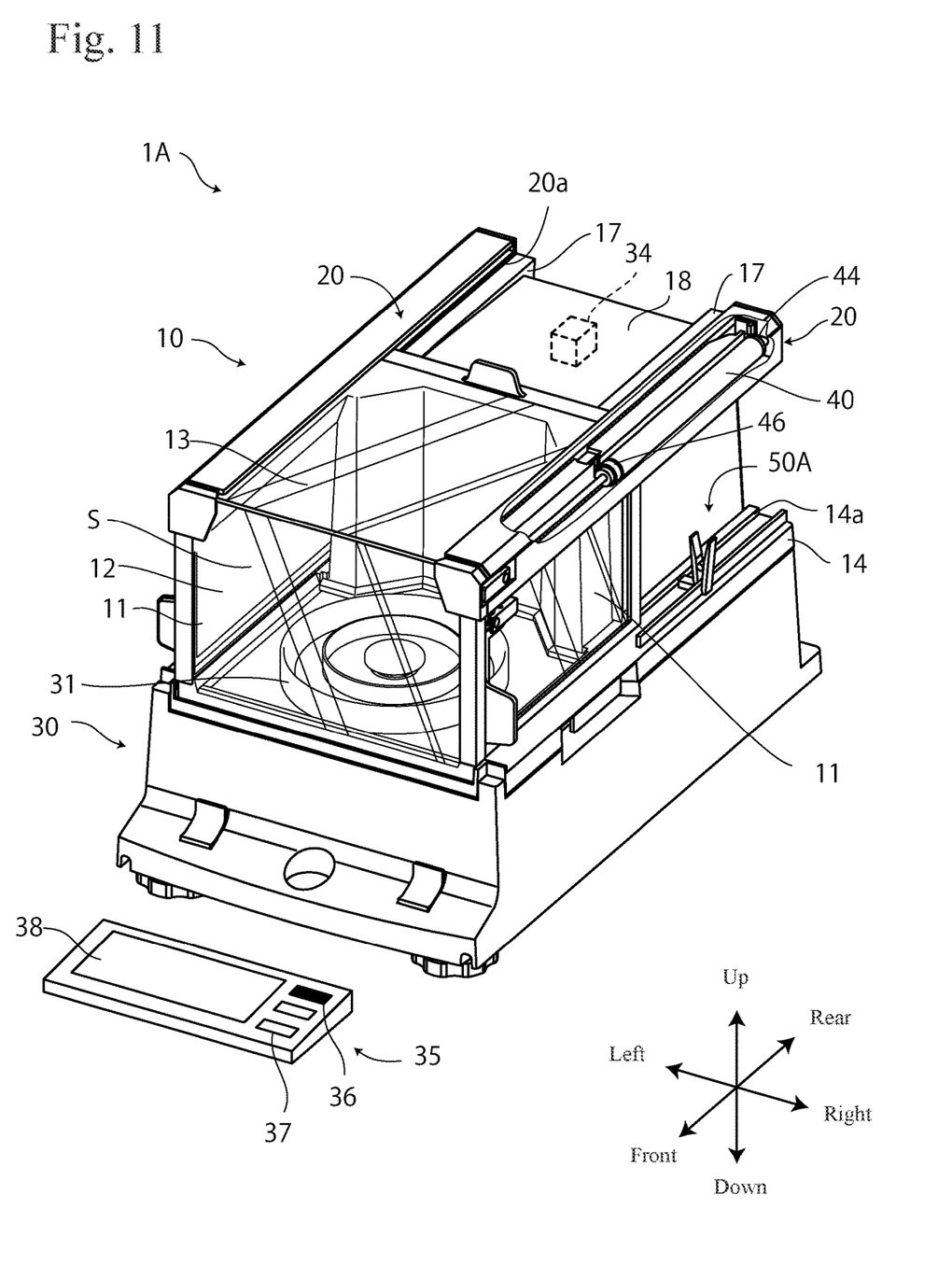
FIG. 11 is a perspective view of an electronic balance with a windshield according to a second embodiment.

FIG. 11 is a partially broken-away perspective view of an electronic balance 1A with a windshield according to a second embodiment. Components having equivalent configurations are provided with the same reference sign, and description thereof is omitted.

The electronic balance 1A with a windshield has a configuration equivalent to the configuration of the first embodiment except that the electronic balance includes a half-opening mechanism 50A to open and close the door 11 to a desired position in place of the half-opening mechanism 50 that automatically half-opens/closes the door.

Figure 12A:
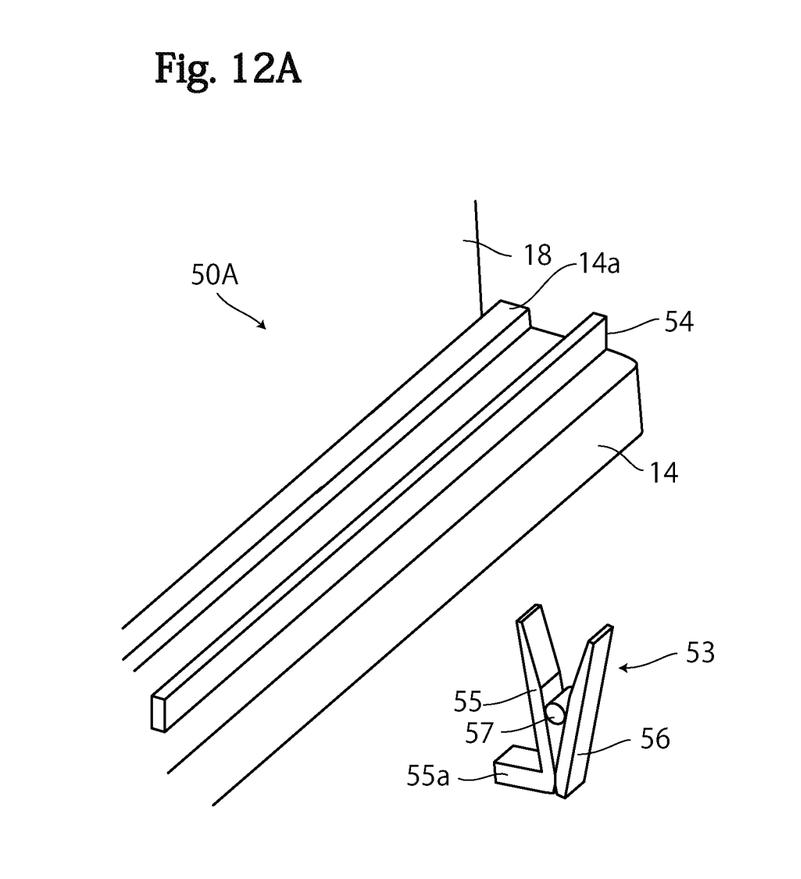
FIGS. 12A and 12B are explanatory views to describe a configuration of a half-opening mechanism of the door according to the second embodiment.
Figure 12B:
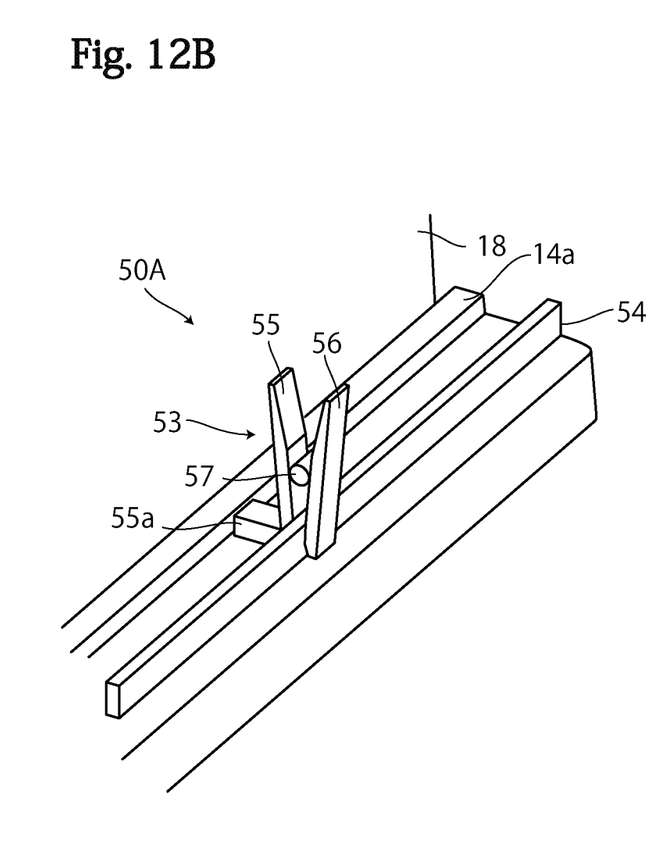

FIG. 12 are explanatory views for describing a configuration of the half-opening mechanism 50A. FIG. 12 illustrate the case 18, the lower frame 14, and the half-opening mechanism 50A, and FIG. 12(A) illustrates a non-use state of a stopper 53, and FIG. 12(B) illustrates a use state of the stopper 53.

The half-opening mechanism 50A consists of a projecting rail 54 formed on the lower frame 14, and the stopper 53.

The projecting rail 54 is provided on an upper surface of the lower frame 14 to project in the form of a line at a position that is near the movement path of the door 11 and does not obstruct movement of the door 11, and provided parallel to the rail 14a, that is, parallel to the sliding direction of the door 11.

The stopper 53 is a clip structure formed by combining two arms 55 and 56 so that both lower end portions freely open and close by using an elastic member (spring) 57 as a base point. The lower end portions are biased in closing directions by the elastic member 57, so that by squeezing both upper end portions of the arms between fingers, the arms can be opened and caused to pinch an object by the lower end portions.

When using the stopper 53, the stopper 53 is caused to pinch the projecting rail 54 at a desired position on the line-shaped projecting rail. On the lower end portion of one arm 55, a latch portion 55a is formed outward, and when the projecting rail 54 is pinched by the stopper 53, the latch portion 55a enters a groove formed between the rail 14a and the projecting rail 54 and is disposed at a position where the latch portion 55a comes into contact with a side surface of the moving door 11.

As described above, the door 11 stops moving when coming into contact with the stopper 53 (latch portion 55a) disposed on the movement path. Further, when a signal for closing is input, the door returns from there and moves. The door 11 is automatically half-opened/closed at the disposed position of the stopper 53, and the degree of opening of the door 11 is determined according to the position where the stopper 53 is disposed.

The stopper 53 only clips the projecting rail 54, and a user can attach/detach the stopper 53 by pinching the stopper 53 with the user's fingers. When the stopper 53 is not used, the stopper 53 only has to be removed or disposed at an end portion of the projecting rail 54. For preventing the stopper 53 from being lost, a storage place may be provided in the case 18.

Only by disposing (clipping by) the stopper 53 at a desired position in the longitudinal direction of the projecting rail 54, a closed position of the door 11 can be determined, and a stop position of the door 11 can be grasped at a glance.

Embodiments and modifications of the present invention have been described above, and the embodiments and modifications can be combined based on knowledge of a person skilled in the art, and such a combined embodiment is included in the scope of the present invention.

REFERENCE SIGNS LIST 1, 1A Balance with windshield
10 Windshield
11 Door
34 Control unit
40 Air cylinder
51, 53 Stopper
62A, 62B Pressurization pump
64A, 64B Pressure sensor

The invention claimed is:

1. A windshield for a balance to be provided for a balance, the windshield having a door to be automatically opened and closed by a driving means, comprising:
a sensor configured to monitor movement of the door;
a stopper disposed on a movement path of the door and configured to block movement of the door; and
a control unit configured to stop the driving means when the sensor detects that movement of the door has been blocked,
wherein an opening degree of the door is determined according to a position where the stopper is disposed.

2. The windshield for a balance according to claim 1, wherein an air cylinder is joined as the driving means to the door, the sensor is a pressure sensor configured to monitor a pressure of air to be supplied to the air cylinder, and the control unit is configured to stop the supply of air to the air cylinder when the pressure of air monitored by the pressure sensor exceeds a predetermined value.

3. The windshield for a balance according to claim 1, wherein the stopper is supported turnably near the door and the stopper is selectively disposed on or out of a movement path of the door according to a turning angle of the stopper.

* * * * *